United States Patent [19]

Brekkestran et al.

[11] Patent Number: 5,023,430

[45] Date of Patent: Jun. 11, 1991

[54] HYBRID ELECTRONIC CONTROL SYSTEM AND METHOD FOR COLD WEATHER GARMENT

[75] Inventors: Kevin L. Brekkestran, Fargo; Barry D. Batcheller, West Fargo, both of N. Dak.

[73] Assignee: Environwear, Inc., Fargo, N. Dak.

[21] Appl. No.: 405,142

[22] Filed: Sep. 8, 1989

[51] Int. Cl.$^5$ .............................................. H05B 1/02
[52] U.S. Cl. .................................. 219/486; 219/483; 219/211; 219/497; 2/69
[58] Field of Search ............... 219/211, 212, 494, 497, 219/499, 501, 505, 507, 508, 509, 491, 483–486; 307/38–41; 2/69

[56] References Cited

U.S. PATENT DOCUMENTS

| 710,429 | 10/1902 | Collins et al. | 219/211 |
|---|---|---|---|
| 3,363,087 | 1/1968 | Buxbaum et al. | 219/211 |
| 3,783,240 | 1/1974 | Drummond, Jr. | 219/486 |
| 3,789,190 | 1/1974 | Orosy et al. | 219/497 |
| 3,858,028 | 12/1974 | Kerr | 219/211 |
| 4,042,803 | 8/1977 | Bickford | 211/211 |
| 4,087,675 | 5/1978 | Sansonetti | 219/211 |
| 4,132,262 | 1/1979 | Wibell | 219/212 |
| 4,251,718 | 2/1981 | Cole | 219/501 |
| 4,277,670 | 7/1981 | Mori et al. | 219/212 |
| 4,359,626 | 11/1982 | Potter | 219/499 |
| 4,404,460 | 9/1983 | Kerr | 219/211 |
| 4,485,296 | 11/1984 | Ueda et al. | 219/505 |
| 4,523,084 | 6/1985 | Tamura et al. | 219/497 |
| 4,549,074 | 10/1985 | Matsuo | 219/212 |
| 4,723,068 | 2/1988 | Kusuda | 219/494 |
| 4,798,936 | 1/1989 | Johnson, Sr. | 219/216 |

FOREIGN PATENT DOCUMENTS

2228709 6/1972 Fed. Rep. of Germany ...... 219/485
57-13526 1/1982 Japan.

Primary Examiner—M. H. Paschall
Attorney, Agent, or Firm—Harness, Dickey & Pierce

[57] ABSTRACT

A hybrid, open-loop electronic temperature control system and method of heating for an electrically heated cold weather garment having a plurality of independent heating zones. In one embodiment the system includes: a plurality of conductive heating wires, with at least one such heating wire being disposed in each zone of the garment and operable to heat each zone of the garment independently; a plurality of solid-state semiconductor power switching devices for controllably allowing current flow through each heating wire; and plurality of power selection circuits, with each having a potentiometer and being associated with each solid-state power switching device, for providing individual power level selection for each heating wire of the garment. This gives the wearer individual control over the temperature level of each zone of the garment. Further power control is provided by a master power level selection circuit and potentiometer which operates to simultaneously and uniformly increase or decrease the overall power level applied to the switching devices, which increases or decreases uniformly and simultaneously the temperature of each of the zones of the garment. A triangular waveform generator is included for providing pulse width modulated control over the heating elements to help conserve electrical power. Overcurrent protection circuitry is also included which monitors the total current drawn by the heating elements.

22 Claims, 6 Drawing Sheets

HYBRID ELECTRONIC CONTROL SYSTEM AND METHOD FOR COLD WEATHER GARMENT

CROSS-REFERENCE TO RELATED APPLICATIONS

The present application is related to the following commonly assigned, patent applications filed concurrently herewith:

"Electronic Control System For Cold Weather Garment", application Ser. No. 07/405,626;

"Fused Electrical Connector With Sewing Wings", application Ser. No. 07/404,887, now U.S. Pat. No. 4,927,366;

"Electrically Heated Form-Fitting Fabric Assembly", application Ser. No. 07/404,827; and "Electrically Heated Garment", application Ser. No. 07/405,627.

The disclosures of all of the applications cited above are hereby incorporated by reference and made a part hereof the same as if fully set forth herein.

BACKGROUND OF THE INVENTION

1. Technical Field

This invention relates generally to electronic control systems for electrically heated cold weather garments, and more particularly to a hybrid electronic control system and method for controlling electric heating levels within an electrically heated, cold weather garment.

2. Discussion

Electrically heated garments, such as electric shirts, pants, socks, gloves and the like are helpful in combatting the effects of cold temperatures on a person subject to prolonged exposure to severe weather. Heated garments can prove helpful to persons such as sportsmen, farmers, construction workers, public officials, and military personnel, who frequently are exposed to cold weather for prolonged periods of time.

Problems with prior art electronic control systems for electrically heated garments have existed with respect to the ability to heat a plurality of discrete heating zones of the garment independently. Heating different zones individually with a high degree of control is desirable because of the varying rate at which different parts of the body lose heat. The extremities, i.e., hands, feet and head, for example, suffer from a greater heat loss than the torso. In addition, physical activities of the wearer of the garment can cause different parts of his body to generate heat at varying levels. A system which applies the same level of heat to all areas of the garment can therefore produce temperature levels within the garment that are uncomfortable to the wearer.

Prior art electronic control systems, to be able to control the heat applied to various zones of the garment independently, typically require an independent, user actuable switch for each zone to enable or interrupt the current flowing to its associated heating element or elements. In these systems the control of the wearer over the amount of heat generated by the various heating elements of the suit is quite limited; the heating elements are either fully on or fully off, thereby generating either maximum heat or no heat at all. In some prior art systems, attempts have been made to provide variable control over the heat generated by each heating element by using switches to selectively connect a power source to a plurality of heating elements having different heat generating capabilities or characteristics. In this manner some control is allowed over the amount of heat generated for a particular zone of a garment, but still only in fixed steps. Prior art systems of the types described above are disclosed in the following U.S. Pat. Nos.:

| U.S. Pat. No. | Issued | Inventor(s) |
| --- | --- | --- |
| 710,429 | 1902 | Collins et al |
| 3,858,028 | 1974 | Kerr |
| 4,404,460 | 1983 | Kerr |
| 4,251,718 | 1981 | Cole |

The need for multiple, user actuable on-off switches to control the temperature of various zones of a heated garment is inconvenient to the wearer of a heated garment as he or she carries on many outdoor activities. Furthermore, a temperature control system which allows only for fixed increment changes in the amount of heat generated by the various heating elements of the garment does not provide the degree of temperature control needed to produce a comfortable temperature environment within the garment under widely varying environmental conditions and wearer activities.

It would therefore be desirable to have an electronic control system capable of selectively increasing or decreasing the power level or heating applied to each zone of an electrically heated garment independently of the other zones.

It would also be advantageous if such a control system could also be operated, through a single user adjustable control, to increase or decrease the power levels being applied to all the zones simultaneously and uniformly. Such a feature would allow a wearer of the garment to quickly raise or lower the overall warmth provided by the suit as much or as little as needed to compensate for changing environmental conditions.

It is therefore a principal object of the present invention to provide an electronic temperature control system for controlling the power levels of heating applied to a plurality of predetermined zones of a cold weather garment independently of each other.

It is a further object of the present invention to provide a temperature control system and a method capable of allowing a wearer of the garment to adjust the heating level of a particular zone of the garment to achieve a desired temperature level, independently of the other zones of the garment.

It is another object of the present invention to provide a temperature control system capable of rapidly increasing or decreasing the temperature of each zone of the garment simultaneously and in a uniform manner.

SUMMARY OF THE INVENTION

The present invention overcomes limitations of prior art temperature control systems for electrically heated garments by providing a hybrid (i.e., part analog, part digital) electronic control system capable of finely regulating the current levels applied to heat a plurality of discrete heating zones or areas of the garment independently of each other.

The control system of the present invention provides distinct, finely controlled current signals to a plurality of independent heating elements disposed within a plurality of independent heating zones of a cold weather garment. One or more of the heating elements may be disposed within each independent heating zone of the garment. The system includes: a plurality of solid-state electric current switching means for rapidly switching current and off independently and substantially simultaneously to each of the independent heating zones; and a plurality of first power level selection means, each such means being associated with a respective one of the heating zones and being operable to allow a wearer of the garment to independently control a power level supplied to its associated heating element. In a preferred embodiment of the present invention, a second master power level selection means is also included for further allowing a wearer of the garment to control the plurality of solid-state switching means in a substantially simultaneous and uniform fashion. The plurality of first power level selection means and the second power level selection means operate cooperatively to control the solid-state switching means to thereby control the heating current applied to each heating zone. Pulse width modulation ("PWM") techniques are used to control the solid-state switching devices so as to produce any desired level of heating at any independent heating zone.

BRIEF DESCRIPTION OF THE DRAWINGS

The various features and advantages the electronic control system and method of the present invention will become apparent to those skilled in the art upon reading the following specification and subjoined claims, and by reference to the drawings wherein like reference numerals designate similar components in the various Figures, and in which:

DETAILED DESCRIPTION OF THE PREFERRED EMBODIMENT

Figure 1:
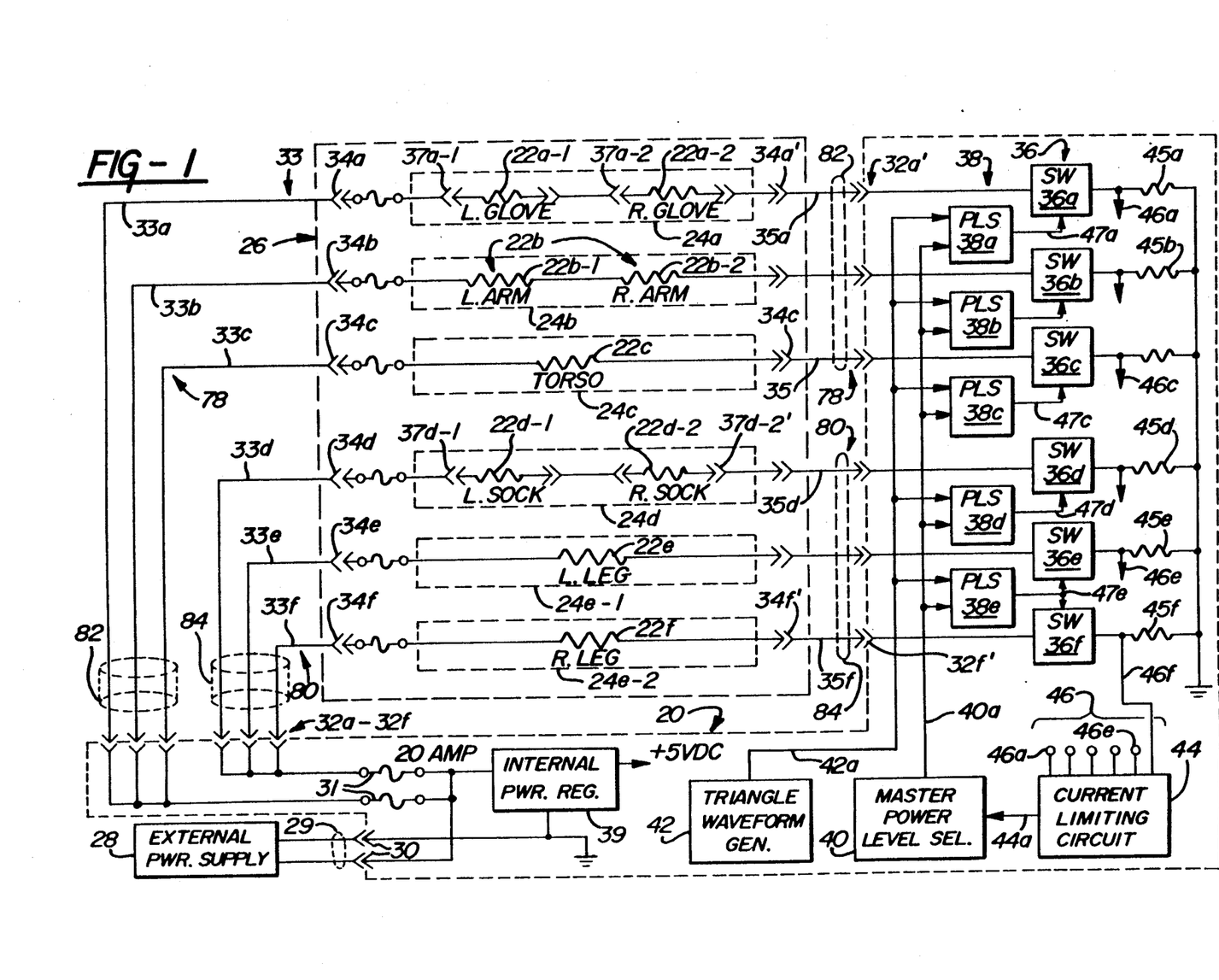
FIG. 1 is a simplified block diagram of the overall hybrid electronic control system of the present invention for controlling an electrically heated cold weather garment, which is shown in the diagram as a group of resistive heating elements, with the control system including pluralities of solid-state switching elements and power level selection devices, a triangular waveform generator, a master power level selection device, and an overcurrent protection circuit.
Figure 2:
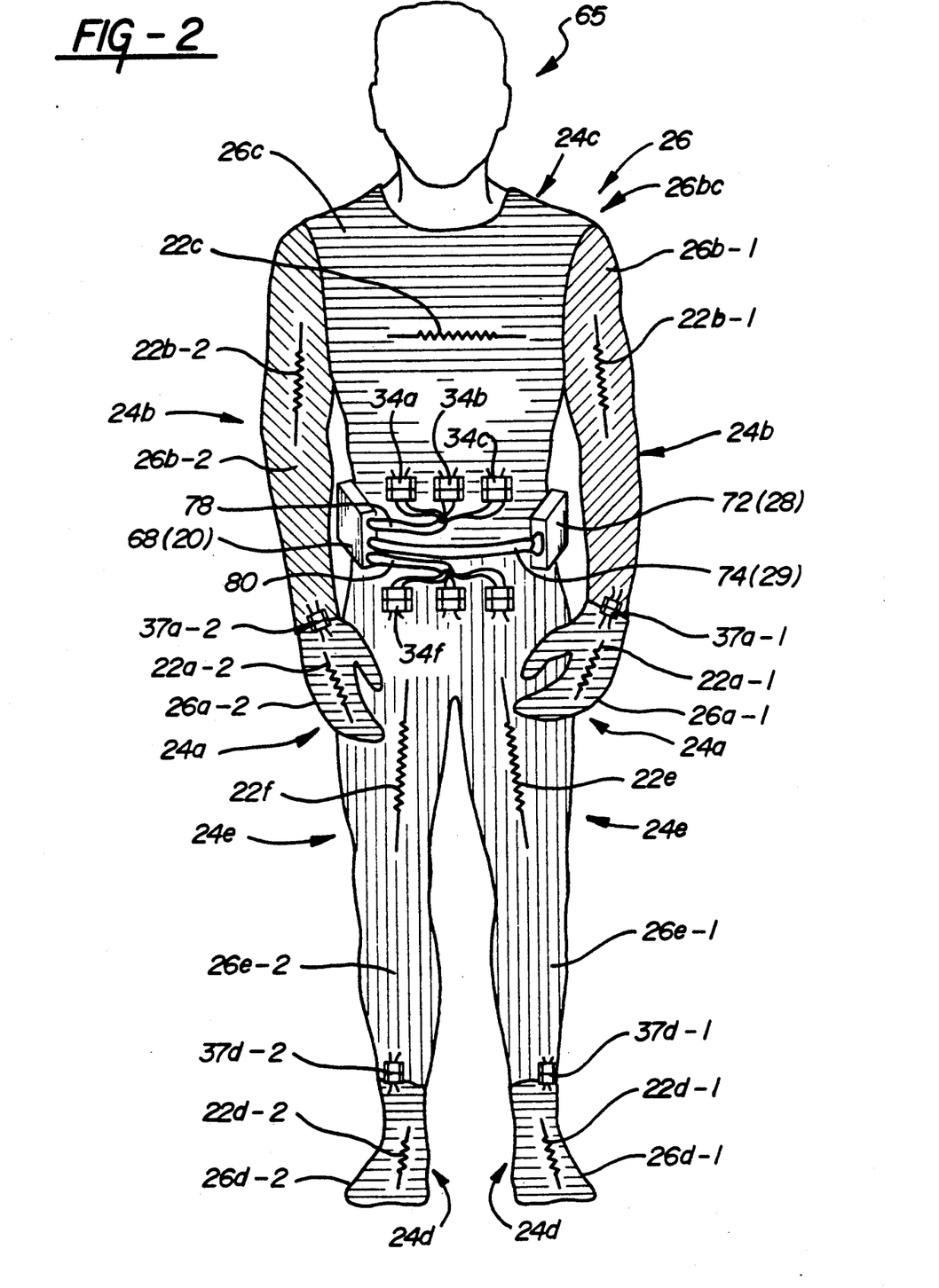
FIG. 2 is an illustration of one possible arrangement of FIG. 1 control system and full body electrically heated garment including several independent heating zones, with a highly simplified representation of the resistive heating elements within each zone.

FIG. 1 shows a simplified block diagram of the overall electronic control system 20 of the present invention. The system 20 is a proportional, open-loop control system which supplies PWM current signals to resistive heating elements 22a-22f respectively located within independent heating zones 24a-24e of an electrically heated garment 26. The garment 26 and its independent zones are indicated by dashed line blocks in FIG. 1. The independent heating zones 24a-24e of the garment 26 will be discussed in more detail in connection with FIG. 2. The system 20 may if desired be constructed on single printed circuit ("PC") board housed with a small wearable injection-molded plastic housing, as shown in FIG. 2.

The system 20 may be powered by any suitable electrical power source such as internal or external batteries, or a power cord connected to any convenient source of power such as a portable generator or the electrical system of a boat, snowmobile, cycle or jeep. Due to weight considerations, an external source of power is preferred over batteries when available, and is represented by external power supply 28 in FIG. 1. The power source preferably provides to the control system 20 a substantially constant voltage, direct current ("DC") signal in the range of about 10 to 24 volts, and more preferably 12 to 14 volts. However, if desired, an alternating current ("AC") source may be used by providing a conventional AC-to-DC converter as part of the system 20.

DC electrical power is supplied through conductors 29 to electrical connectors 30 and then through two suitably sized fuses 31, which in turn supply power through electrical connectors 32 and conductors 33 to fused electrical connectors 34 leading to the heating elements 22a-22f. The electrical power, after passing through the resistive elements 22, travels through the return paths within connectors 34 to wires 35 that lead back to electrical connectors 32 leading to the control system 20. Additional electrical connectors 37a and 37d are also preferably provided for the heating elements 22a and 22d so that the hands and socks sections of the garment 26 can be separately disconnected. The connectors 30, 32 and 32' are preferably conventional edge connectors which fasten to the PC board of the system 20.

The control system 20 includes: a group 36 of solid-state power switching devices 36a-36f, a group 38 of user-adjustable power level selection ("PLS") circuits 38a-38e, an internal power regulator circuit 39, an optionable user-adjustable master power level selection circuit 40, a periodic waveform generator 42, and current-limiting protection circuitry 44. The functions of each of these components or circuits will now be briefly explained.

The power regulator circuit 39 is of conventional design and converts a small portion of the unregulated electrical power from connectors 30 into +5 volts DC for use as needed by the other circuits within system 20.

The group 36 of switching ("SW") means 36a-36f are for rapidly and independently turning on and off the heating element or elements of each of the heating zones 24a–24e. Each of the switching means 36 preferably includes a metal oxide semiconductor field effect ("MOSFET") power transistor. These switching transistors 36a–36f are controlled by the group 38 of first power level selection means 38a–38e, which are individual circuits that provide pulse width modulated (i.e., rapid on and off) control signals on lines 47a–47e to cause the desired finely controlled switching action of the switching transistors 36a–36f to produce the desired average level of heating within each zone. Further control of the switching transistors 36 is provided through a second or master, power level selection circuit 40. The master power level selection circuit 40 provides a control signal on line 40a for the simultaneous and uniform control or adjustment of the duty cycle of the PWM signals controlling the on and off switching action of all the switching transistors 36 in a manner that will be further explained with regard to FIG. 6. It should be appreciated, however, that the master power level selection circuit 40 is not necessary for proper operation of the system 20, but has been included to provide a global or over-all adjustment for the individual switching transistors 36a–36d, to thereby provide a wearer of the garment 26 with a way of easily and simultaneously varying the heating levels of all the individual heating elements 22a–22f, either up or down, as desired.

In the system 20, the waveform generator 42 provides on line 42a a repetitive sweep signal, such as a triangular waveform, that is used as the time base in producing the PWM control signals that regulate the switching action of the power transistors 36. The functions and interactions of the individual zone power level selection circuits 38, the master power level selection circuit 40, and how the pulse width modulation is produced by using the triangle waveform from generator 42 will be discussed in greater detail in connection with FIG. 6.

The current limiting circuit 44 of system 20 is an overload prevention circuit that monitors the total current flowing through the heating elements 22a–22f. This monitoring is accomplished by shunt resistors 45a–45f which provide individual voltage signals on conductors 46a–46f to current-limiting circuit 44. When the total current exceeds a predetermined threshold or amount, circuit 44 supplies an overriding control signal via line 44a to the master power level selection circuit 40 that automatically reduces the duty cycle of the PWM signals driving the switching transistors 36, which limits the current flowing through each of the heating elements 22 in a simultaneous and uniform manner. The current limiting protection circuitry 44 will also be discussed in connection with FIG. 6.

Due to the large current requirement for heating the pants zone 34e, two separate power switches 36e and 36f, connectors 32e and 32f wiring sets 35e and 35f and heating elements 22e and 22f are used. Note that the output signal from PLS circuit 44e is fed as the PWM input signal on line 47e to both power switches 36e and 36f. In this manner, one PLS circuit 38 identically controls two separate power switches and heating elements.

FIG. 2 is a pictorial illustration of the overall garment 26 being worn by a man 65. The garment 26 is preferably worn as an under-garment very close to the skin to maximize heat transfer to the body and to allow insulating layers of clothing to be placed over it to help retain heat which the heating elements 22 generate. The garment 26 is preferably tight-fitting, and highly stretchable to minimize air pockets and other spaces between the garment and the skin that tend to trap air, reduce heat transfer, and promote pumping of heated air from within the garment to areas outside the garment.

FIG. 2 shows the different independent heating zones 24a–24e of the garment 26. The heating elements 22a-1–22d-2 are also shown in FIG. 2 as simple resistors to avoid cluttering the Figure. The preferred constitution and pattern of the heating elements will be discussed shortly in connection with FIGS. 3 through 5. The man 65 is shown wearing, at the right side of his waist, a slim lightweight rectangular enclosure 66 which houses the electronics of the control system 20, and, at the left side of his waist, another slim lightweight enclosure 72 which may house any conventional high-energy battery pack. Battery pack may, if desired, serve as the external power supply 28 shown in FIG. 1. A suitable length power cord 74 may be used to connect the pack 72 to system 20 or to another nearby electrical power source.

Electrical wiring harnesses 78 and 80 are used to connect the control system 20 to connectors 34a through 34c and connectors 34d through 34f as shown. Harnesses 78 and 80 include conventional insulative protective sheathings 82 and 84, which are represented by dashed lines in FIG. 1. As shown in FIG. 1, wiring harness 78 includes conductors 33a–33c and 35a–35c, while wiring harness 80 includes conductors 33d–33f and 35d–35f.

The overall garment 26 shown in FIG. 2 preferably consists of four separately wearable garment sections, namely: the hand section 26a consisting of hand coverings 26a-1 and 26a-2 to heat the left hand and right hand respectively; the long-sleeve shirt section 26bc covering the arms and torso including the shoulders; the socks section 26d consisting of socks 26d-1 and 26d-2 covering the left foot and right foot respectively; and the pants section 26e covering both legs and the hip area. The hand coverings 26 may be mittens, but preferably are gloves for greater finger dexterity.

In the garment 26 as shown in FIG. 2, heating zone 24a is made up of the two hand coverings 26a. Zone 24b includes the left and right arm sections 26b of the garment 26, while a third zone 24c covers the torso including the shoulders. The socks zone 24d covers both feet including the ankles. The legs zone 24e covers both legs and the hip area. Although five independent zones have been illustrated in FIG. 2, it should be appreciated that any convenient number of discrete independent heating zones may be employed, as long as an appropriate number of power switching devices and independent power level selection circuits are also included in the system 20. For example, an additional zone could be provided so as to heat each hand separately, and/or another zone could be provided to heat the head, assuming of course that another garment section, taking the form of a hood, face mask or the like, is provided.

The garment 26 may be one-piece if desired, but is preferably be constructed as at least a two piece suit comprising a vest or shirt section and a pants section. The term "vest" is used here in its usual sense as an article of clothing that covers most of the torso, but not the arms. The shirt section may be either long-sleeve or short-sleeve or may have an in-between sleeve length. The pants section may similarly have any desire length of pant leg. Such two (or more) piece constructions allow the garment 26 to be easily and quickly put on and removed, and also allow each section to be used or replaced separately. The hand zone 24a and socks zone 24d are optional, and their respective garment sections 26a and 26d need not be worn unless desired. To facilitate such optional use, the additional electrical connectors 37a-1, 37a-2, 37d-1 and 37d-2 are respectively provided so that the hand coverings 26a-1, 26a-2 and socks 26d-1 and 26d-2 may be individually removed whenever desired.

The two piece suit configuration is facilitated by the two sets of connectors 34a through 34c and 34d through 34f which are preferably located generally where shown in FIG. 2. The connectors 34a through 34f each also preferably contain a built-in fuse which may be sized as desired (for example, at 7 to 8 amps) to provide individual short circuit protection for respective electrical heating elements 22a through 22f in the garment 26. Suitable fused and unfused electrical connector assemblies of the type just mentioned may be attached by sewing one-half of each such connector assembly to respective sections of the garment as shown in FIG. 2. Such connector assemblies are fully described in aforementioned application Ser. No. 07/404,887. Note that the fuses 31 within control system 20 also provide protection against short circuits.

The use of these types of connectors 34 and 37, as shown in FIG. 2 and mentioned earlier herein, with each zone 24a-24e of the garment 26 allows the garment 26 to be readily be configured as desired by the wearer to adapt to specific weather conditions and activity requirements of the wearer. It should also be appreciated that connectors may be used elsewhere, for example, at the shoulder, to make the arm section 26b and arm zone 24b individually detachable from the torso section 26c.

The fabric used to construct the long-sleeve shirt section 26bc and pants section 26e of the garment 26 may be any suitable fabric, but very preferably is a THERMAX-LYCRA blend woven or knit into lightweight fabric. Such fabric is now commercially available from E.I. du Pont de Nemours and Co., of Wilmington, Del. ("DuPont"). This fabric has been chosen for its superior wicking capability, i.e., its ability to absorb perspiration from the skin and dissipate it rapidly through evaporation, its light weight, and its ability to be sewn up into garments that are comfortable, stretchable, and yet are tight-fitting. The hand and feet sections 26a and 26d may similarly be made from any suitable fabric, but preferably are made from 100% DACRON knit fabric. LYCRA is a trademark of DuPont for its brand of spandex, i.e., fiber including a long-chain synthetic polymer such segmented polyurethane that imparts elasticity to garments such as girdles, socks, and special hosiery. THERMAX is a trademark of DuPont for its brand of highly insulating synthetic polyester fiber. DACRON is a trademark of DuPont for its polyester fiber made from polyethylene terephthalate. Further details of the preferred fabric and construction techniques used to assemble various sections of the garment 26 are described in aforementioned applications Ser. No. 07/404,827 and Ser. No. 07/405,627.

The heating elements 22a-1-22d-2 themselves may be sewn against the inside of the garment 26 fabric, i.e., that side which is in contact with the skin, or on the outside of the fabric. For example, if the outside is chosen, the physical presence of the wire outside the layer of fabric will not interfere with or degrade the action of the fabric in wicking away perspiration from the skin.

The resistive heating elements 22a1-22f themselves will preferably each be made of a continuous piece of suitably sized multi-strand copper wire to facilitate flexion in all directions without breakage. Suitable gauges for the wire are 20 to 33 gauge (AWG), with 26 gauge being preferred for the shirt and pants sections, and 28 gauge for the hands and socks sections. They will each also be enclosed within extruded nylon or tetrafluoroethylene insulation, with the overall wire preferably having a diameter or thickness in the range of about 0.010 to 0.100 inches and preferably about 0.050 inches. An insulated heating wire such as was just described will be able to provide a level of heat to the skin of the wearer which corresponds to at least about 100° Fahrenheit, without producing an uncomfortably warm sensation against the skin of the wearer of the garment 26. The copper wire will also preferably have a consistent percent quantity of copper from suit to suit to provide an accurate and repeatable temperature to resistance relationship. The resistance of the wire will be in the range of about 0.005 ohms/foot to about 0.100 ohms/foot, and preferably between about 0.30 ohms/foot and about 0.50 ohms/foot.

Figures 3, 4, 5:
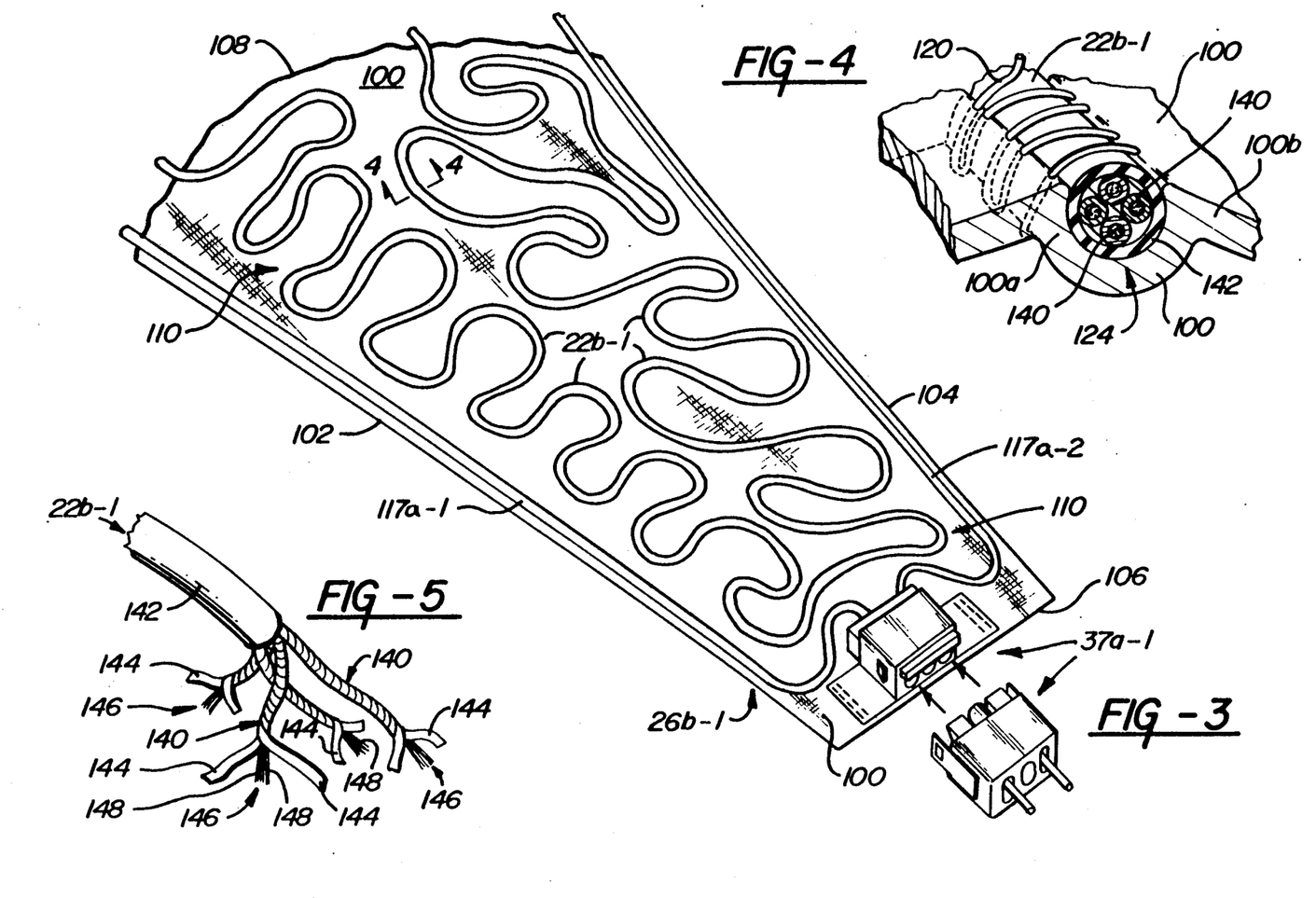
FIG. 3 is a perspective view of the arm panel of fabric for the garment, prior to its longitudinal edges being sewn together, which shows the serpentine pattern in which the wire heating element is preferably arranged.
FIG. 4 is a highly enlarged perspective, cross-sectional view of a fragment of the FIG. 3 arm panel taken along line 4—4 of FIG. 3 and illustrating the cover stitching holding a wire heating element to the fabric in a manner which pulls the fabric upwardly to partially circumscribe the wire heating element.
FIG. 5 is a perspective view showing the construction of a multiple conductor tinsel wire with an outer insulating jacket that is a preferred wire heating element for the FIG. 2 garment.

FIG. 3 shows a panel 100 of fabric used to make a sleeve or arm, such as the left arm section 26b-1 of the garment section 26 of FIG. 2. The panel 100 has two longitudinal edges 102 and 104 which are sewn together to form a conventional sleeve seam, wrist edge 106 and curved edge 108 which forms part of the shoulder seam. FIG. 3 illustrates a typical serpentine pattern 110 in which the wire heating element 22b-1 is preferably arranged on the left arm section 26b-1. Similar serpentine patterns are preferably used for the other heating wires 22c, 22e and 22f in the arms, torso and leg sections of garment 26. It should be understood, however, that variations in the serpentine pattern 102 may be made to adapt it to other parts of the garment 26 such as the torso. The critical concern of any serpentine or other pattern used is that there are no sharp bends in the wire heating elements 22, which would likely significantly increase the chance of breakage, as the body panel or section of the garment 26 into which the heating wires 22 are sewn move and stretch during repeated wearings. The serpentine pattern 52 addresses this concern well, however, as it allows the heating elements 22a-1-22d-2 to bend and flex easily and even move relative to the fabric well and stitching surrounding it without breaking while the garment 26 is being stretched in various directions while being worn.

The serpentine pattern 52 of FIG. 3 further provides a more uniform distribution of the heat produced by each heating element 22 of the garment 26 which is so arranged. As such, when the left arm section 26b-1 is sewn into its final constructed form, the various areas of the left arm section, (i.e., upper arm, lower arm, front and back of the arm) will all be heated relatively uniformly by the heating element 22b-1.

FIG. 3 also shows electrical connector assembly 37a-1 for providing power to the wire heating element 22a-1 in the left hand covering or glove 26a-1 (not shown in FIG. 3). Power is provided to connector 37a-1 via electrical conductors 117a-1 and 117a-2 which are routed along the longitudinal edges 102 and 104 respectively of fabric panel 100.

In FIG. 4, an enlarged, fragmentary, perspective, view of heating element 22a-1 showing the manner in which it is stitched in place in the fabric panel 100 of FIG. 3. From FIG. 4, it can be seen that the cover stitching 120 holding heating wire 22b-1 in place zigzags back and forth across the wire and is sufficiently tight such that it draws portions 100a and 100b of the fabric 100 located adjacent opposite sides of the wire upwardly to partially circumscribe the heating element 22a-1, thereby creating a continuous elongated pocket or trough 124 of semi-circular or U-shaped cross-section enclosing most of the heating element 22a-1. The stitching 50 is also preferably quite dense so as to almost completely enclose the surface of the heating element 22a-1 which is not covered by the fabric 100 of the arm section 26b-1. In other words, individual adjacent portions of the continuous thread forming the stitching are closer together than shown in FIG. 4. The stitching pattern of FIG. 4 provides a method for securely holding the heating elements 22a-1 in place within the fabric of the arm section 48 while still allowing the heating element 22a-1 to flex and stretch slightly with the movements of the wearer of the garment 26, thus promoting flexibility of the garment 26 and further reducing the chance of breakage of the heating element 22a-1. Additionally, this stitching arrangement allows the wire heating element 22b-1 to move longitudinally relative to adjacent fabric portions 100a and 100b within the pocket 124. This arrangement is preferably used in all of the garment sections, and further improves resistance to wire breakage and the flexibility and comfortableness of the garment sections.

A preferred construction for the heating element 22 is illustrated in FIGS. 4 and 5 and includes four conducting elements 140 of circular cross section packaged within an electrically insulating jacket 142. Each conducting element 140 includes two tinsel-like conductors 144 and a high-strengthed flexible core portion 146 made up of several smaller synthetic fibers 148. The insulating jacket 142 is preferably be made from a fluoropolymer resin and have a thickness of preferably about 0.02 to 0.3 inches. In addition, it is preferred that insulation be fume-free and also be relatively chemically inert. An insulation having the above characteristics is "Tefzel", a fluoropolymer resin commercially available from DuPont.

The number of conducting elements 140 of a particular heating element 22 may range from one to about 20 (or more), with at least two and preferably with at least 6 to 10 being included within the insulating jacket 142. Including between about 2 and 20 conducting elements 140 within heating element 22 provides good flexibility and also helps to resist intermittent or complete electrical or mechanical breaks within the heating element.

In FIG. 5 the tinsel-like conductors 144 and the core portions 146 of each conducting element 140 are shown more clearly. Each conducting element 140 contains at least one, and preferably at least two or more, tinsel conductors 148 wound in a spiral fashion around its associated core portion 146. Further details about the construction of heating elements are given in aforementioned application Ser. No. 07/404,827.

Figure 6:
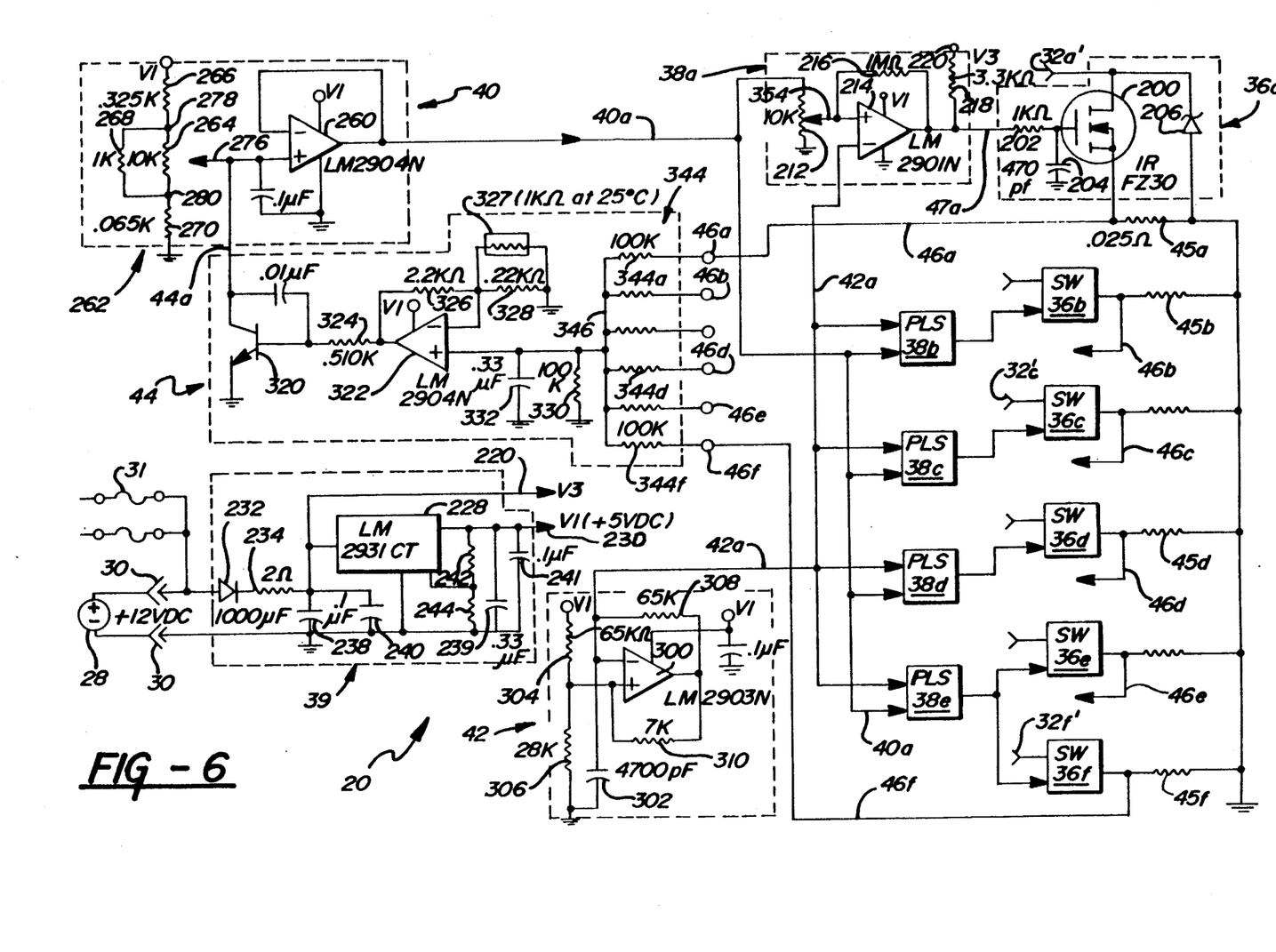
FIG. 6 is an electrical schematic diagram illustrating representative circuitry of the FIG. 1 control system used for providing finely controlled current signals to the independent heating zones provided for the arms, torso, legs and sock sections of the garment.

FIG. 6 is a detailed electrical schematic diagram showing various circuits used within the system 20 of FIG. 1. In particular, FIG. 6 shows a typical switching means, namely power switch 36a. The other power switch circuits 36b through 36f are identical to switch circuit 36a. FIG. 6 also shows a typical power level selection circuit, namely PLS circuit 38a. The other PLS circuits 38b through 38e are identical in construction to circuit 38a. FIG. 6 also shows a practical implementations for the internal power regulator 39, the master power level selection circuit 40, the triangular waveform generator 42 and current limiting circuit 44. Typical types, model numbers or values of solid-state components, capacitors and resistors used in system 20 are given in FIG. 6 adjacent to or within the symbols corresponding circuit. The components used within each circuit will be reviewed and their function explained, and then the overall operation of the control system 20 and interaction between the various circuits will be explained.

The power switch 36 is constructed around a n-channel, enhancement mode power MOSFET 200. A resistor 202 and a capacitor 204 form a low pass filter which helps smooth and remove any high frequency noise from the input signal received on a line 47a from the power selection circuit 38a. A conventional zener diode 206 is provided to protect the MOSFET 200 from accidental overvoltages or reverse voltage surges from any source. The MOSFET is preferred as a switching transistor on account of its very low source-to-drain impedance when turned on, which helps eliminate unnecessary operating power loss within the transistor 200, where a heating effect is not desired. Although MOSFETS are the preferred switching devices, it will appreciated that other solid-state semiconductor switching devices may be used to provide the solid-state switching action required of power switches 36.

Power level selection circuit 38a includes a user-adjustable potentiometer 212, an operational amplifier 214 having a high impedance feedback resistor 216, and a pull-up resistor 218 connected to a terminal 220, a source of electrical power to pull up output line 47a of the op amp 214. Op amp 214 is used as an open loop comparator, as will later be more fully explained.

Power regulator section 39 is constructed around a conventional +5 volt regulator 228. It takes an unregulated DC voltage signal, such as +12 volts delivered from external power source 28 through connectors 30, and produces the highly regulated +5 volt supply signal V1 on line 230 used to supply the other circuits as needed with low-voltage electrical power. Diode 232 of regulator section 39 serves to protect against accidental reverse polarity power connection of external source 28 to the control system 20. Low impedance resistor 234 in series with diode 232 serves to protect against excessive power draw by the regulator or other portions of control system 20 connected to line 220. Thus, the supply signal V3 on line 220 is only approximately 0.7 volts less than the external supply voltage. This helps ensure that when the output of op amp 214 in PLS circuit 38a is its high impedance off state, the voltage on line 47a of PLS circuit 38a is sufficiently high to completely turn on the power transistor of power switch 36a. Capacitors 238, 239 and 240, 241 are respectively used for low frequency and high frequency filtering, while resistors 242 and 244 are used to select the desired output voltage (+5V) to be produced by the regulator chip 228.

The master power selection circuit 40 produces an adjustable analog output voltage on its output line 40a. Circuit 40 includes: an operational amplifier 260 arranged as a voltage follower; a resistor network 262 which includes a user adjustable regular precision 10 kilo-ohm potentiometer (pot) 264 and fixed resistors 266, 268 and 270 having values as shown. The pot 264 and 1 kilo-ohm resistor 268 are arranged in parallel and serve to make the parallel combination act like a 900 ohm pot with much greater precision than the 10 kilo-ohm pot 264 actually has.

In the series resistor network 262, the value of the voltage on the positive input line 44a of amplifier 260 can be varied by adjustment of pot 264 between the voltages at upper node 278 and lower node 280 of the resistor network 262. When the supply signal V1 has a value of +5.0 volts DC, the input voltage on line 276 can be varied by pot 264 between about 0.05 volts to about 3.7 volts, and the output voltage of amplifier 260 on line 40a will follow accordingly. The voltage on input 276 to amplifier 260 can also be varied by the control signal from line 44a originating within the current limiting circuit 44. The output impedance of circuit 44 as measured on line 44a is normally very high (greater than 100 kilo-ohms), but under certain conditions can be lowered so as to reduce the voltage level then existing on line 44a, in a manner and for reasons that will be described in greater detail shortly.

The waveform generator circuit 42 is of conventional design and produces on its output line 42a a sweep signal at a constant frequency. In other words, its output is a signal which monotonically changes between a low (high) value, such as 0.0 volts, and to a higher value, such as +3.7 volts, at a predetermined frequency. In the preferred embodiment of circuit 42, this frequency is in the range of 800–900 hertz, but can be lower or higher if desired. In order for the control system 20 to operate effectively, however, the frequency of the signal should be at least one to two hertz, and preferably at least 10 hertz. However, higher frequencies in the range of 300 to 1,000 hertz are even more preferred in order to smoothly average the electrical current being drawn by all of the heating elements 22, and also to provide very quick response to adjustments by the operator of the potentiometers 212 or 264. Generator circuit 42 is configured as an astable multivibrator circuit constructed around an operational amplifier 300. The size of capacitor 302 and the values of resistors 304 through 310 determine the precise oscillation rates and voltage levels achieved in the manner well understood by those in the art. In FIG. 6, triangular waveform 314 depicts a portion of the continuous periodic output signal V2 produced on line 42a by the generator circuit 42.

Current limiting circuit 44 includes: an npn bipolar junction transistor 320 which produces an analog output signal of variable impedance; an operational amplifier 322 used as a DC amplifier; current limiting resistor 24; resistors 326 and 328 and thermistor 327 connected to the negative input of op amp 322 used to set the gain of op amp 322 nominally to somewhere in the range of 10 to 20; pull-down or drain resistor 330 and filter capacitor 332, both connected to the positive input of amplifier 322. Circuit 44 also includes a group of 100 kilo-ohm summing resistors 344a–344f arranged in parallel and connected to a common line 346 on one side thereof and to input terminals or wires 346a–346f as shown. In a manner which will be more fully explained shortly, the feedback signals supplied on lines 46a–46f from shunt resistors 45a–45f are used to determine the overall or aggregate current passing through heating elements 22 in the garment 26.

The thermistor 327 is used to monitor the internal temperature within the enclosure 68 housing the control system 20. As the temperature goes up, the resistance of thermistor 327 increases, which increases the gain of op amp 322. In this manner, the internal temperature of the enclosure of the control system 20 can be limited by reducing the maximum current allowed. Also, as the ambient temperature increases outside the enclosure 68, this will tend to cause the temperature within the enclosure to rise somewhat. Under this and the last-mentioned condition, the thermistor 327 tends to increase the overall sensitivity of circuit 44 which limits or reduces the overall current that system 20 provides to the heating elements 22.

Each of the individual or zone power selection circuits 38a–38f produces on its respective output line 47a–47f a pulse width modulated (PWM) signal which drives its respective power switching device 36a–36f. The operation of all these devices may be fully understood by the following explanation of how PLS circuit 38a and power switch 36a work to drive the hands zone 24a which includes resistive heating elements 22a-1 and 22a-2 arranged in series. The operation of circuits 36a and 38a may be best understood by referring to the timing diagram of FIG. 7.

Figure 7:
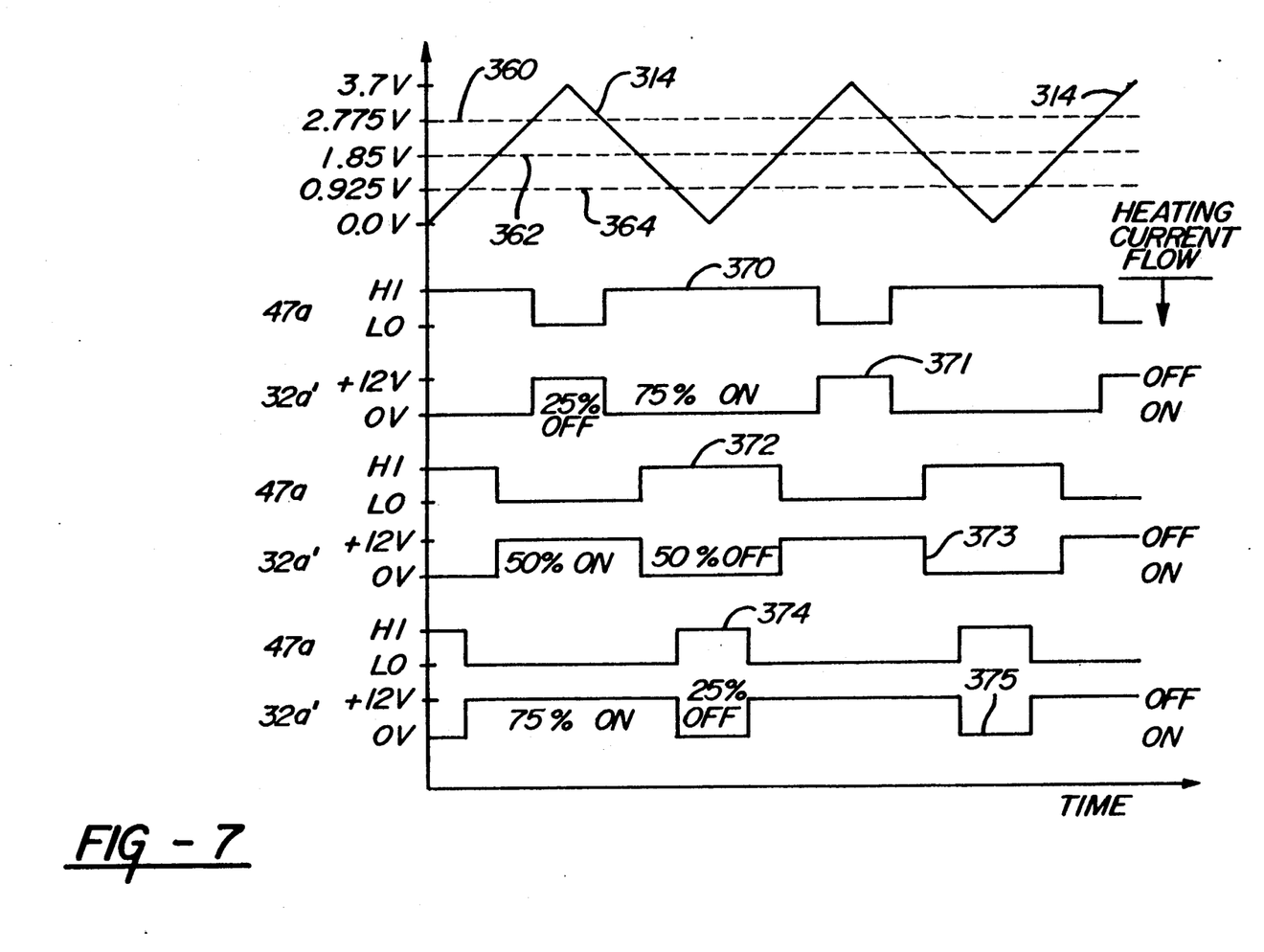
FIG. 7 is a timing diagram of a various waveforms produced by the FIG. 5 circuitry illustrating the intervals time during which the switching elements will be in conducting and non-conducting modes, and how those time periods are controlled by adjustments to the power level selection devices.

FIG. 7 shows, as triangular waveform 314, the periodic sweep signal delivered by line 42a to the negative input of comparator 214 in PLS circuit 38a. The wiper 354 of pot 212 delivers a selected voltage signal to the positive input of comparator 214. When the voltage level on the positive input of comparator 214 exceeds the voltage on the negative input of comparator 214, the output of the comparator will be high. Conversely, when the voltage on the positive input is less than the voltage than is present on the negative input, the comparator output will be low, that is shorted to ground. When the output of comparator 214 goes high, it does not sink any current so that voltage supply signal V3, at about +12 volts, will provide current through pull-up resistor 218 to cause the output 47a to very quickly reach the level of the V3 signal near 12 volts. Likewise, when the output of comparator 214 is low the voltage on line 47a very quickly is sunk to near zero volts. The foregoing comparator operation and signal relationships are illustrated for three different voltage levels on line 354, the positive input of comparator 214. Assume that the maximum voltage of sweep signal V2 on line 42a from generator 42 is 3.7 volts and that its minimum value is 0.0 volts as shown. Also assume that horizontal dashed lines 360, 362 and 364 respectively represent 75 percent, 50 percent and 25 percent values respectively of 3.7 volts. When the 75 percent signal, represented by dashed line 360, is applied to the positive input 354 of comparator 214, waveform 370 results on output line 47a of comparator 214, which causes the transistor 200 to switch on and off in a manner shown by waveform 371 in FIG. 7. As shown there, waveform 371 means the current is on, that is flowing through heating elements 22, 75 percent of the time and is off, that is not flowing, 25 percent of the time, for a duty cycle of 75 percent.

Similarly, when 1.85 volts, that is signal 362, is applied to input 354 of comparator 214, a 50 percent duty cycle output signal is produced on line 47a as represented by waveform 372 and current flows through the heating elements 22, 50 percent of the time as represented by waveform 373. Finally, when the positive input voltage is 25 percent of the maximum value of signal V2, as represented by dashed line 364, the output of comparator 214 is low 75 percent of the time and high 25 percent of the time as depicted by waveform 374, and thus, current flows through resistive heating elements only 25 percent of time as shown by waveform 375.

Since the wiper 354 of potentiometer 212 can be positioned to select any desired voltage value between 0 volts and the maximum value of the signal on line 40a, which is preferably equal to the maximum value of the signal on line 42a from waveform generator 42, any desired duty cycle from 0 to 100 percent can be selected by the user for the heating elements 22a of the hand zone 34a. Also, since each PLS circuit 38 contains a similar independently adjustable pot, different duty cycles and therefore different heating levels can be individually and independently selected for each heating zone at any time.

The master power level selection circuit 40 adjusts the voltage level on line 40a up or down in accordance with the setting of potentiometer 264. Similarly, as the collector impedance of transistor 320 decreases, the voltage level on line 44a decreases, thereby causing a corresponding decrease in the voltage on line 40a. When the voltage level of line 40a decreases, the effective voltage on line 354 going to positive input of comparator 214 is lowered proportionately. This in turn reduces the duty cycle by a corresponding amount. Thus the duty cycle may be reduced through the master control section either by adjusting the pot 264 or by causing the output impedance of the current limiting circuit 44 to decrease. Since the signal 40a is fed into the potentiometer of each PLS circuit 38, the duty cycle of the output signal of each circuit 38 is changed proportionately and simultaneously whenever the voltage level of line 40a changes.

The operation of the current limiting protection circuit 44 will now be described. The shunt resistors 45a-45f connected to the source of each MOSFET in power switch 36a-36f each provide a voltage signal (i.e., voltage drop) indicative of the current flowing through its associated MOSFET and heating element or elements. The voltage drops produced by the resistors 45a are then summed by connecting the resistors 344 arranged in parallel, and the combined voltage signal is input to the positive input of the op amp 322. The op amp 332 has a gain of about 16 in the range of 10 to 20, and more preferably in the range of 12 to 16, at 25 degrees Centigrade. In other words, the gain is selected to provide a positive voltage signal on the op amp output large enough to partially turn on transistor 320 when the summed heating element current detected via the voltage drops of all of resistors 45 just begins to exceed a predetermined level representative of a desired maximum current flowing through the heating elements 22a-1-22f. By "maximum current" is meant a condition where a desired maximum amount of current is being drawn by the heating elements 22a-1-22d-2 collectively, or any one of them alone, and that drawing additional current in excess of this maximum amount will result in some undesirable condition within or outside of the system 20. For example, at this maximum current, there may begin to occur an overheating of some component within system 20, or of the wire heating elements, the power cord or a wiring harness. Alternatively, the external power supply, particularly if battery operated, may have certain ampacity limitations which should not be exceeded. Finally, the maximum current condition may represent an arbitrary point representing the maximum desired level of over-all heating to be produced by a particular configuration of the garment.

When the sum signal on line 346 produced by the feedback signals from shunt resistors 45, exceeds a magnitude representative of the maximum desired heating current in the system 20, the output voltage of amplifier 322 rises sufficiently to render transistor 320 at least partially conductive, which reduces the voltage provided to the positive input of amplifier 260. This in turn, as previously explained, causes the voltage signal on line 40a supplied to the potentiometers of PLS circuits 38 to be reduced. Thus current limiting circuit 44 operates to limit or clamp the maximum current that may be drawn by the heating elements 22a-22f, or any of them alone, to a fixed amount.

Figure 8:
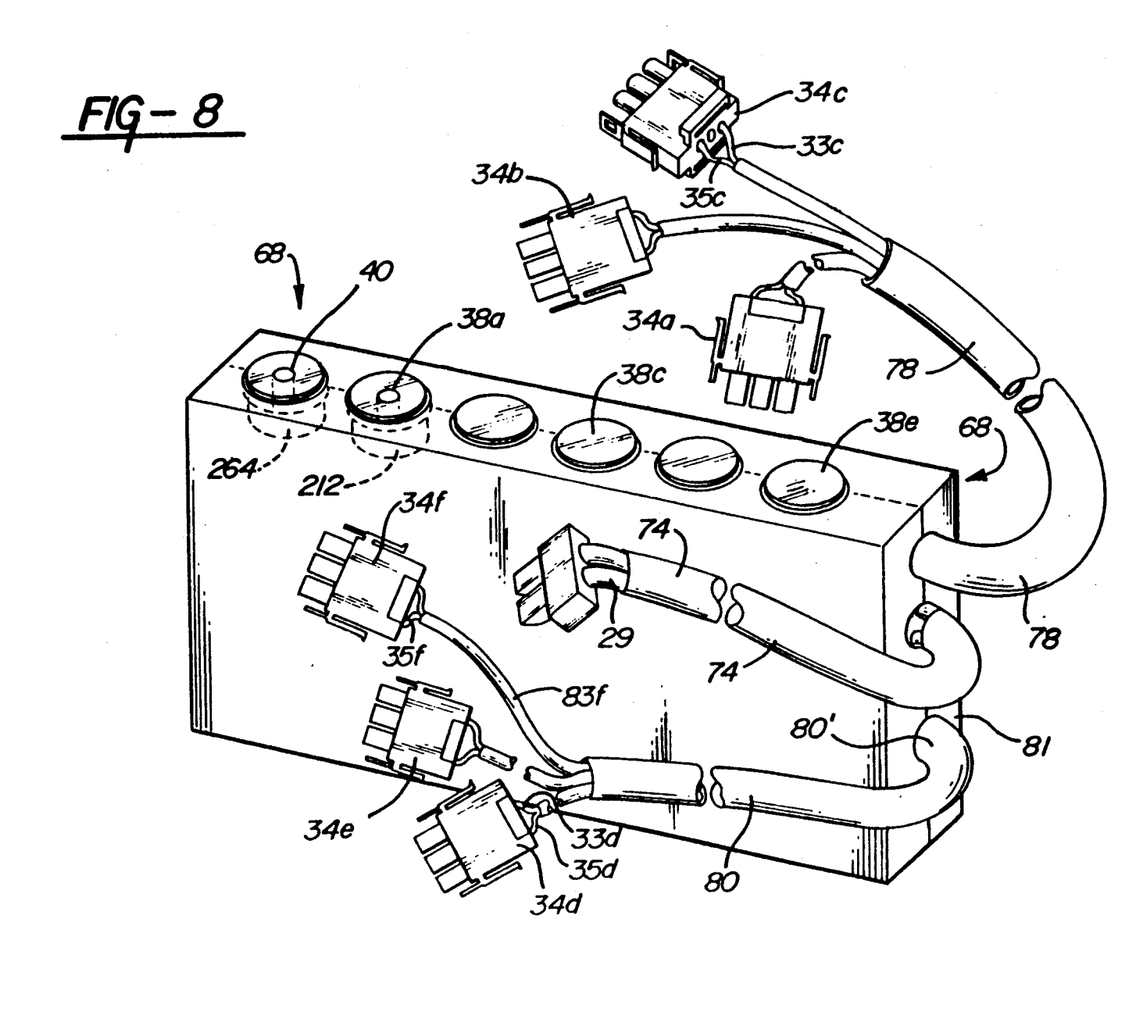
FIG. 8 is an enlarged perspective view of the slender, rectangular enclosure for the FIG. 1 control system showing wiring harnesses and a power cord with attached electrical connectors extending therefrom.

FIG. 8 shows a perspective view of one possible configuration for the enclosure 68 of control system 20, with power cord 74, and wiring harnesses 78 and 80 attached. Along the upper side of the enclosure are shown six potentiometer knobs which are connected to the five potentiometers of the PLS circuits 38a-38e, and the single potentiometer 264 of the master power level selector circuit 40. Further description of the enclosure 68 is found in aforementioned application Ser. No. 07/405,627.

In conclusion, the above-described system 20 thus independently operates each zone as a proportional, open-loop control system that allows for quick and easy selection of a desired temperature within that zone. The system 20 also provides a manual means for simultaneously and uniformly adjusting the ambient temperature levels of all the independent zones of such a garment if weather conditions dictate that the overall warmth provided by the suit must be either increased or decreased. Finally, the control system 20 also provides an automatic closed-loop feedback system using shunt resistors 45, current-limiting circuit 44 and master power level selection circuit 40 to clip or limit the total current drawn by the heating elements to a predetermined maximum.

Those skilled in art can now appreciate from the foregoing description that the broad teachings of the present invention can be implemented in a variety of forms. Therefore, while this invention has been described in connection with particular examples thereof, the true scope of the invention should not be so limited because other modifications will become apparent to the skilled practitioner upon a study of the drawings, specification and following claims.

What is claimed is:

1. A portable, wearable electronic temperature control system for an electrically heated garment having a plurality of independent heating zones, the system comprising:

a plurality of electrically heatable flexible heating elements, each said heating element being associated with a particular heating zone, and being independent of the other heating zones, and being operable to generate heat in response to current flowing therethrough;

a plurality of independent electric current switching means, each switching means being associated with at least one particular heating element and operable to selectively enable and interrupt current flowing therethrough;

a plurality of independent first power selection means, each being associated with a particular switching means of a particular heating zone and each being for independently selecting a desired level of heating for the particular heating zone;

second power selection means, working cooperatively with each first power selection means, for simultaneously and uniformly adjusting the desired level of heating for each of the heating zones in proportion to one another; and current limiting means for detecting an aggregate current flowing through the heating elements and for controlling simultaneously the switching means to limit such aggregate current.

2. The system of claim 1, further comprising oscillator means for providing an intermittent control signal having a repetition rate greater than about 1 Hz simultaneously to each switching means to help turn on and off the switching means in a controlled, intermittent fashion as part of regulating the current provided to the heating element connected thereto.

3. The system of claim 2, wherein the oscillator means includes an astable multivibrator and the intermittent control signal is a triangular waveform.

4. The system of claim 2, wherein the intermittent control signal is an analog signal, and the oscillator means operates cooperatively with each switching means and its associated first power selection means to pulse width modulate each switching means.

5. The system of claim 4, wherein:
each first power selection means produces a desired power level signal corresponding to the desired level of heating for its associated heating zone; and
each switching means includes means for comparing the analog intermittent control signal produced by the oscillator means with the desired power level signal of its associated first power level selection means, and for generating a controlled switching signal in response to the comparison for pulse width modulating the switching means.

6. The system of claim 1, wherein the heating elements include a plurality of insulated wires arranged within their respective zones in a serpentine pattern to help distribute heat evenly throughout the heating zones and to facilitate flexion of the heating elements without breakage.

7. The system of claim 1, wherein each electric current switching means includes a power transistor.

8. The system of claim 1, wherein each of the independent first power selection means includes an independent potentiometer, each potentiometer being operable to provide a first voltage indicative of the desired level of heating for its associated zone, each first voltage being operable to at least partially control when its associated switching means enables and interrupts current flowing through its associated heating element.

9. The system of claim 1, wherein the second power selection means is a potentiometer operable to provide a second voltage simultaneously to each of the first power selection means, which second voltage may be increased or decreased to substantially uniformly and simultaneously increase or decrease the amount of current to be provided to each of the heating elements.

10. The system of claim 1, wherein the current limiting means comprises:
a plurality of resistors, each resistor being associated with a particular switching means and operable to provide a signal representative of the current flowing through its associated switching means;
means for summing the signals representative of the current flowing through the switching means to provide an aggregate signal representative of the aggregate current flowing through the heating elements;
comparator means for determining when the aggregate signal exceeds a predetermined value and for generating a control signal when the aggregate signal exceeds the predetermined value; and
analog control means for limiting the aggregate current by adjusting simultaneously and substantially uniformly in real time when each switching means selectively enables and interrupts the current flowing in each of the heating elements, said analog control means being responsive the control signal from the comparator means.

11. The system of claim 1, wherein at least one heating zone has associated with it a plurality of heating elements.

12. A portable, electronic temperature control system for an electrically heated garment having at least first and second independent heating zones, with each such zone being associated with at least one electric heating element for applying heat to the zone, the system comprising:
a plurality of first power level selection means, each such means being associated with a respective one of the heating zones and being for independently selecting under control of a wearer of the garment a power level to be produced by the heating element of its associated heating zone;
master power level selection means for simultaneously and uniformly adjusting under control of the wearer of the garment an overall level of heating to be achieved by the heating zones, said means being arranged to work simultaneously in conjunction with each of the first power level selection means by effectively modifying in proportion to one another the power levels selected via the first power level selection means; and
a plurality of solid-state electric current switching means, each such means being associated with a respective one of the heating zones, and being for switching one and off independently and substantially simultaneously electric current to the heating element associated with its respective heating zone, each such switching means operating automatically and in accordance with at least one time-varying signal received thereby and with the power level selected by the first power level selection means associated with the same heating zone as the switching means is associated with,
whereby the levels of heating applied to the zones may be independently controlled via the first power selection level means and may be simultaneously and uniformly adjusted via the master power selection level means.

13. The system of claim 12, further comprising means for sensing an aggregate current flowing through said heating elements and controlling each of said switching means in a substantially uniform manner to limit the aggregate current flowing through said heating elements to not exceed a predetermined value.

14. The system of claim 12, further comprising master time base means for working cooperatively with each first power selection means to produce a pulse width modulated control signal for the switching means associated with the first power selection means, thereby producing an intermittent switching on and off of each heating element.

15. The system of claim 12, wherein each switching means is a solid-state semiconductor device.

16. The system of claim 12, wherein each first power level selection means is a wearer adjustable potentiometer.

17. The system of claim 12, wherein the master power level selection means is a wearer adjustable potentiometer.

18. A portable, wearable electronic control system for selectively heating in an independent fashion a plurality of independent zones of a cold weather garment, the system comprising:
   means for generating a time-varying signal having a frequency of at least two Hertz;
   a plurality of independent heating wires, each heating wire being disposed in a particular zone of the garment and operable to generate heat in response to current flowing therethrough;
   a plurality of independent, wearer adjustable first temperature control potentiometers for facilitating selection of a desired temperature level for each zone by a wearer of the garment;
   control circuit means, including a second temperature control potentiometer adjustable by a wearer of the garment, for increasing or decreasing proportionately and simultaneously the desired temperature levels of all of the zones; and
   a plurality of independently controllable switching means, each such switching means being associated with a particular heating wire and being for selectively enabling and disabling current flowing through its respective heating wire in response to the time-varying signal, the control circuit means, and a respective one of the first potentiometers.

19. The system of claim 18, wherein the power switching device is a field effect transistor.

20. A method of independently regulating heating in a plurality of independent heating zones of an electrically heated garment, each such zone having at least one electric heating element disposed therein, the method comprising:
   providing a plurality of solid-state electric current switching devices, and connecting each such device to at least one heating element in each heating zone of the garment;
   generating a master power level signal indicating a desired level of overall heating which is adjustable by a wearer of the garment;
   generating a plurality of independent, pulse width modulated signals, each such sign being associated with a particular solid-state switching device and zone of the garment and having a duty cycle controllable by a wearer of the garment and by the master power level signal;
   applying each such pulse width modulated signal to its respective switching device substantially simultaneously; and
   whereby the pulse width modulated signals applied to the switching devices in a simultaneous and independent fashion operate to controllably and independently start and stop current flowing through the heating elements, thereby regulating independently heating power levels applied to the zones, and
   whereby the level of heating in each of the zones may be adjusted simultaneously an din proportion to one another through adjustments to the master power level signal.

21. The method of claim 20, further comprising the step of
   providing an analog master time base signal having a triangular waveform and at least one predetermined frequency, and wherein
   the step of generating includes the sub-step of modifying the master time base signal in accordance with the power levels selected by the wearer for the zones such that each of the pulse width modulated signals has a duty cycle proportional to the selected power level of its respective zone.

22. The method of claim 20, further comprising the steps of:
   monitoring current being drawn through the electric heating elements; and
   reducing the duty cycle of each of the pulse width modulated signals when the current being drawn exceeds a predetermined amount.

* * * * *

UNITED STATES PATENT AND TRADEMARK OFFICE
CERTIFICATE OF CORRECTION

PATENT NO. : 5,023,430
DATED : June 11, 1991     Page 1 of 2
INVENTOR(S) : K. Brekkestran et al.

It is certified that error appears in the above-identified patent and that said Letters Patent is hereby corrected as shown below:

Column 3, line 1, after "current" insert ---- on ----.

Column 3, line 23, after "advantages" insert ---- of ----.

Column 3, line 40, after "of" insert ---- the ----.

Column 3, line 63, delete "a" (second occurrence).

Column 3, line 65, after "vals" insert ---- of ----.

Column 6, line 58, delete "be".

Column 6, line 64, delete "desire" and insert ---- desired ----.

Column 7, line 27, delete "be" (second occurrence).

Column 9, line 36, delete "be".

Column 9, line 68, delete "mentations" and insert ---- mentation ----.

UNITED STATES PATENT AND TRADEMARK OFFICE
CERTIFICATE OF CORRECTION

PATENT NO. : 5,023,430

DATED : June 11, 1991

INVENTOR(S) : K. Brekkestran et al.

It is certified that error appears in the above-identified patent and that said Letters Patent is hereby corrected as shown below:

Column 16, line 6, after "responsive" insert ---- to ----.

Column 16, line 36, delete "one" and insert ---- on ----.

Column 18, line 5, delete "sign" and insert ---- signal ----.

Column 18, line 21, delete "an din" and insert --and in--.

Signed and Sealed this

Tenth Day of January, 1995

Attest:

BRUCE LEHMAN

Attesting Officer

Commissioner of Patents and Trademarks